(12) United States Patent
Hutyan et al.

(10) Patent No.: US 10,519,903 B2
(45) Date of Patent: Dec. 31, 2019

(54) AIR INLET SYSTEM

(71) Applicant: JC Bamford Excavators Limited, Uttoxeter (GB)

(72) Inventors: Peter Hutyan, Uttoxeter (GB); Kevin Browne, Uttoxeter (GB); Colin Loud, Uttoxeter (GB); Ryan Ballard, Uttoxeter (GB)

(73) Assignee: JC Bamford Excavators Limited, Uttoxeter (GB)

( * ) Notice: Subject to any disclaimer, the term of this patent is extended or adjusted under 35 U.S.C. 154(b) by 895 days.

(21) Appl. No.: 14/700,022

(22) Filed: Apr. 29, 2015

(65) Prior Publication Data

US 2016/0319782 A1 Nov. 3, 2016
US 2018/0252189 A9 Sep. 6, 2018

(30) Foreign Application Priority Data

May 1, 2014 (GB) .................. 1407740.8

(51) Int. Cl.
| | | |
|---|---|---|
| *G01F 1/88* | (2006.01) | |
| *F02M 35/10* | (2006.01) | |
| *G01F 1/44* | (2006.01) | |
| *G01F 15/18* | (2006.01) | |
| *G01F 1/68* | (2006.01) | |
| *G01F 1/76* | (2006.01) | |
| *G01F 15/00* | (2006.01) | |

(Continued)

(52) U.S. Cl.
CPC ......... *F02M 35/10386* (2013.01); *F02M 35/10091* (2013.01); *F02M 35/10144* (2013.01); *F02M 35/10347* (2013.01); *G01F 1/44* (2013.01); *G01F 1/68* (2013.01); *G01F 1/76* (2013.01); *G01F 1/88* (2013.01); *G01F 15/005* (2013.01); *G01F 15/04* (2013.01); *G01F 15/14* (2013.01); *G01F 15/18* (2013.01)

(58) Field of Classification Search
CPC ....................................................... G01F 1/88
See application file for complete search history.

(56) References Cited

U.S. PATENT DOCUMENTS 1,892,184 A * 12/1932 Woolley ............... G01F 1/88
    318/257
4,264,961 A     4/1981 Nishimura et al.
(Continued)

FOREIGN PATENT DOCUMENTS

EP    1 422 405 A2    5/2004
EP    1992812 A2    11/2008
(Continued)

OTHER PUBLICATIONS

Search Report for GB 1407740.8, dated Oct. 31, 2014.
(Continued)

*Primary Examiner* — Lisa M Caputo
*Assistant Examiner* — Alex T Devito
(74) *Attorney, Agent, or Firm* — Marshall, Gerstein & Borun LLP

(57) ABSTRACT

An air inlet system for an internal combustion engine comprising an air inlet duct which has an upstream end including an opening and a downstream end for connection to an air flow control component and further comprising a mass air flow sensor assembly, the mass air flow sensor being located closer to the downstream end than the upstream end.

18 Claims, 10 Drawing Sheets

(51) Int. Cl.
*G01F 15/04* (2006.01)
*G01F 15/14* (2006.01)

(56) References Cited

U.S. PATENT DOCUMENTS

| | | | |
|---|---|---|---|
| 4,750,464 A | 6/1988 | Staerzl | |
| 5,048,327 A * | 9/1991 | Atwood | G01F 15/00 73/114.33 |
| 5,257,607 A * | 11/1993 | Gillespie | F02B 61/045 123/478 |
| 5,267,467 A * | 12/1993 | Caron | G01F 1/36 73/1.26 |
| 6,467,359 B1 | 10/2002 | Atwood | |
| 2001/0037644 A1 | 11/2001 | Muckelmann et al. | |
| 2003/0110768 A1* | 6/2003 | Coleman | F02B 33/44 60/605.2 |
| 2005/0189167 A1* | 9/2005 | Bozzi | F02M 35/1211 181/240 |
| 2009/0241683 A1 | 10/2009 | Perr et al. | |
| 2010/0037575 A1 | 2/2010 | Mouatt | |

FOREIGN PATENT DOCUMENTS

| | | |
|---|---|---|
| JP | S59221439 A | 12/1984 |
| JP | H2503102 A | 9/1990 |
| JP | 2007146715 A | 6/2007 |
| JP | 2008223524 A | 9/2008 |
| JP | 201071190 A | 4/2010 |
| JP | 2010255581 A | 11/2010 |
| JP | 2012163003 A | 8/2012 |
| JP | 2012202410 A | 10/2012 |
| JP | 2012241556 A | 12/2012 |
| WO | WO-2014/016253 A1 | 1/2014 |

OTHER PUBLICATIONS

Extended European Search Report for European Patent Application No. 15166094.1, dated Sep. 2, 2015.

Office Action received for JP 2015-092506 dated Nov. 27, 2018.

* cited by examiner

# AIR INLET SYSTEM

FIELD OF THE INVENTION

The present invention relates to an air inlet system for an internal combustion engine, particularly but not exclusively to a diesel internal combustion engine. The present invention also relates to an air flow control component.

BACKGROUND OF THE INVENTION

Air inlet systems use mass air flow (MAF) sensors to determine the mass flow rate of air entering a fuel injected internal combustion (IC) engine. These MAF sensors are required to measure the flow rate and also the temperature of the air entering the engine. These data are used by the engine ECU to optimise the fuel-air mixture to maintain fuel economy and reduce emissions. Typically, these MAF sensors are mounted at the upstream inlet end of an air path from the atmosphere to the combustion chambers of an IC engine, close to the air filter.

For off-highway applications in particular, a certain (diesel) IC engine may be used in various machines and mounted in different locations. For example, an engine may be mounted forward of a cab of a backhoe loader in an inline configuration, but transversely in a side pod of a telescopic handler. As such, the ducting that provides the airpath will be different for each installation.

The present applicant has recognised that such MAF sensors currently require a dedicated calibration for each installation. Each of these calibrations costs a significant amount of money and take considerable time to produce. Each time the air path changes, a new air path calibration must be performed. In addition, the farther away that the temperature sensor is from the entry to the engine combustion chambers, the greater the potential for disparity between the measured temperature and the actual temperature of the air entering the combustion chambers, e.g. due to heat transfer from the engine.

The present invention seeks to overcome or at least mitigate the problems of the prior art.

SUMMARY OF THE INVENTION

A first aspect of the invention provides an air inlet system for an internal combustion engine comprising an air inlet duct which has an upstream end including an opening and a downstream end for connection to an air flow control component, and further comprising a mass air flow sensor assembly, the mass air flow sensor assembly being located closer to the downstream end than the upstream end.

Advantageously this will reduce the disparity between the measured temperature of the air and the actual temperature of the air entering combustion chambers and may enable the MAF assembly to be mounted on engine. Further, it may remove the need for a dedicated calibration for each air path, thus providing an overall cost and time saving benefit.

Preferably the mass air flow sensor assembly is mounted proximate to an upstream inlet of the air flow control component.

The air flow control component may be a turbocharger, a throttle or an inlet manifold.

Preferably the mass flow sensor assembly includes an air pressure sensor.

More preferably the air pressure sensor is a Venturi tube.

Yet more preferably the Venturi tube includes bores for measuring tubes of the mass air flow sensor assembly to extend through the housing.

Advantageously, this provides a simple way of mounting the sensor.

Preferably there is no downstream divergent nozzle of the Venturi tube.

Advantageously this provides a compact arrangement.

In one embodiment the mass air flow sensor assembly further comprises a temperature sensor.

Preferably the temperature sensor is a thermistor.

In one embodiment the Venturi tube comprises an inlet and an outlet and wherein the ratio of internal diameters of the outlet and inlet of the Venturi tube system is between 1:1.5 and 1:2.2.

Advantageously this provides a sufficient pressure difference for accurate MAF measurements.

Preferably the air inlet ducting comprises a curve having a pre-determined angle upstream of the mass air flow sensor assembly.

Advantageously this provides standardised flow conditions for the Venturi tube provided the angle of the duct with respect to the MAF normal to the predetermined angle stays within a certain range of angles.

In one embodiment the air inlet ducting comprises a straight portion upstream of the mass air flow sensor assembly which is equal to at least seven times the diameter of the air inlet duct.

Advantageously this provides standardised flow conditions for the Venturi tube.

The air flow control component may comprise a housing.

Preferably the housing comprises a platform for mounting a mass air flow sensor of the mass air flow sensor assembly thereon.

Advantageously, this further integrates the sensor assembly.

In one embodiment the housing is formed from one or more cast components.

Preferably the housing comprises an extension extending upstream from the air flow control component.

More preferably a mass air flow sensor of the mass air flow sensor assembly is mounted directly onto the housing.

Yet more preferably the mass air flow sensor is releasably secured to the housing, preferably to the upstream extension.

The upstream extension of the air flow control component housing may include a Venturi tube.

Preferably the housing is a cast component and the Venturi tube is formed from the same casting as the housing.

Advantageously, this further integrates the sensor assembly.

The upstream extension of the housing may comprise a spigot for mounting an air inlet duct thereto.

The mass air flow sensor assembly may be a standalone mass air flow sensor assembly, being separate and attachable to an air flow control component.

Preferably the standalone mass air flow sensor assembly is attached upstream of the housing of the air flow control component.

In one embodiment the air flow control component is a turbocharger.

In another embodiment the air flow control component is a throttle.

In a further embodiment the air flow control component is an air inlet manifold

A second aspect of the invention provides an air flow control component for an internal combustion engine comprising a housing, wherein the housing is a unitary, for example cast component and a mass air flow sensor assembly is mounted onto the housing.

Advantageously this reduces the number of engine parts and provides a more robust engine component and may remove the need for a dedicated calibration for each air path.

Preferably the mass air flow sensor assembly is mounted proximate an upstream inlet of the air flow control component.

More preferably a Venturi tube is formed from the same unitary component, e.g. casting, as the housing.

In one embodiment the air flow control component is a turbocharger.

In another embodiment the air flow control component is a throttle.

In a further embodiment the air flow control component is an air inlet manifold

A third aspect of the invention provides an internal combustion engine comprising an air flow control component and a mass air flow sensor assembly, wherein the air flow control component and mass air flow sensor assembly are mounted on the engine.

Preferably the mass air flow sensor assembly is mounted proximate an upstream inlet of the air flow control component.

More preferably the air flow control component comprises a housing which is cast and the mass air flow sensor assembly is mounted onto the housing casting.

Still more preferably a Venturi tube is formed from the same unitary component, e.g. casting as the housing.

In one embodiment the air flow control component is a turbocharger.

In another embodiment the air flow control component is a throttle.

In a further embodiment the air flow control component is an air inlet manifold

A fourth aspect of the invention provides a method of assembling an internal combustion engine having an engine block on a first production line, comprising the steps of: assembling internal components of the internal combustion engine into the engine block; and assembling ancillary components of the engine to an exterior of the engine block, including at least one an air flow control component and a mass air flow sensor assembly, the mass air flow sensor assembly being mounted to the air flow control component.

Advantageously this means the MAF may be fitted in a standardised manner with a reduced requirement for calibration.

Preferably the method further comprises the step of installing the engine into a machine, for example a working machine at a second location distinct from the first; the installation comprising connecting an air inlet duct to the mass air flow sensor.

BRIEF DESCRIPTION OF THE DRAWINGS

Embodiments of the present invention will now be described with reference to the accompanying drawings, in which.

DETAILED DESCRIPTION OF EMBODIMENT(S)

Figure 1A:
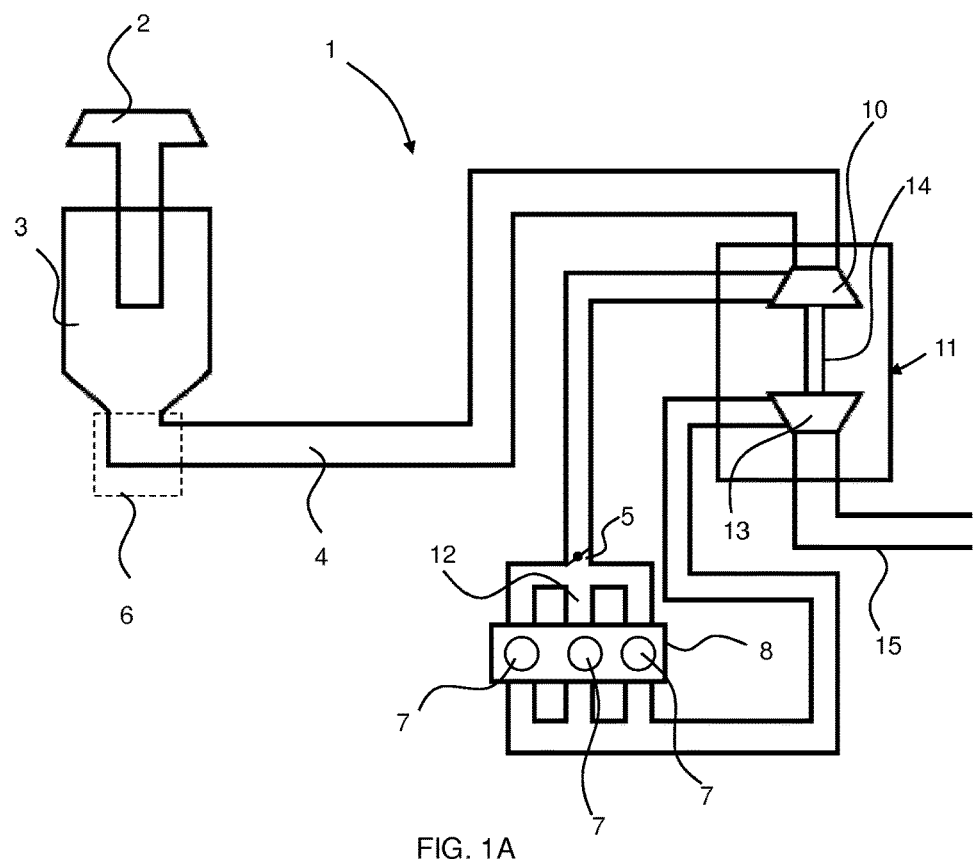
FIGS. 1A and 1B are schematic views of a known engine layout and an engine layout according to embodiments the present invention respectively.

Referring firstly to FIG. 1A, an engine and air inlet system is shown generally at 1 according to an example of the prior art. The air inlet system 1 comprises an air inlet 2 which draws the air into an air inlet duct 4 via an air filter 3. Typically, a MAF sensor 6 is positioned immediately downstream of the air filter 3. The filtered air then flows down the air inlet duct 4, typically via a path incorporating various curves and straight sections to reach a compressor 10 of a turbocharger 11 mounted proximate the combustion chambers 7 of an internal combustion engine. The compressed air then flows through a throttle 5, and enters the combustion chambers 7 of an engine block 8 via an inlet manifold 12. Following combustion, the exhaust gases then flow through the turbine 13 of the turbocharger 11 and drive the compressor 10 via a shaft 14, and pass out of the exhaust 15 after suitable emissions treatment (not shown).

Figure 1B:
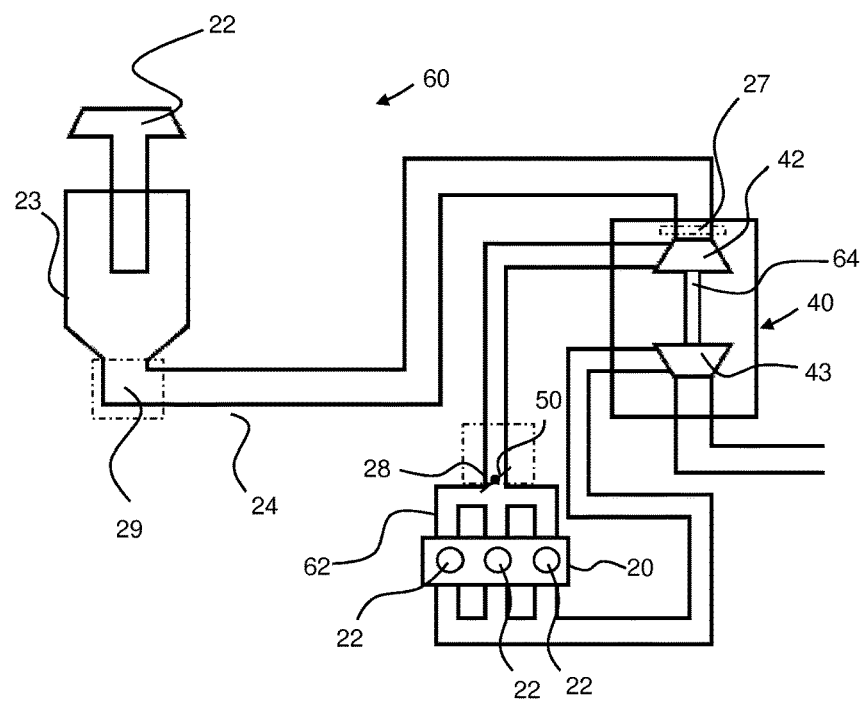
Figure 2:
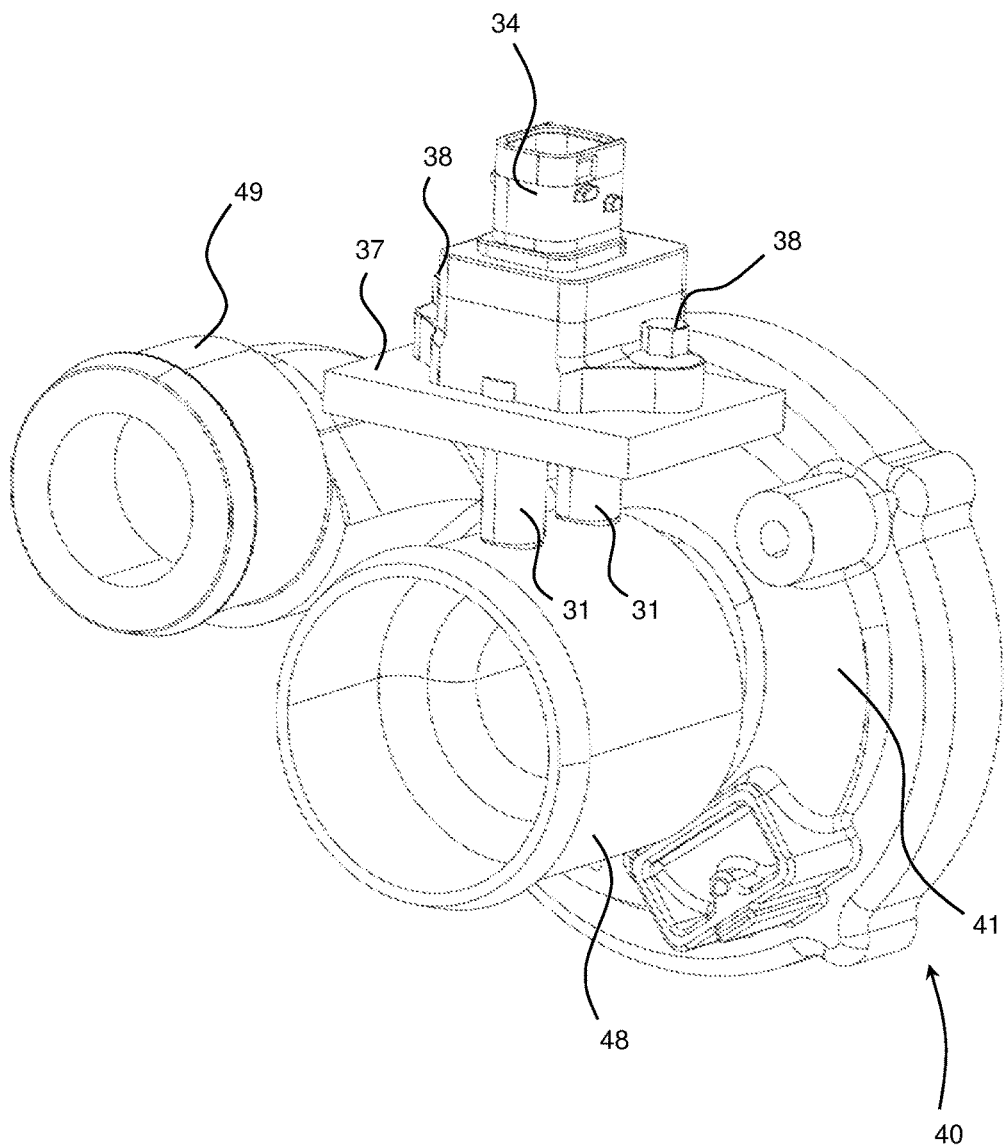
FIG. 2 is an isometric view of a turbocharger with an integrated MAF sensor assembly according to a first embodiment of the present invention.
Figure 3:
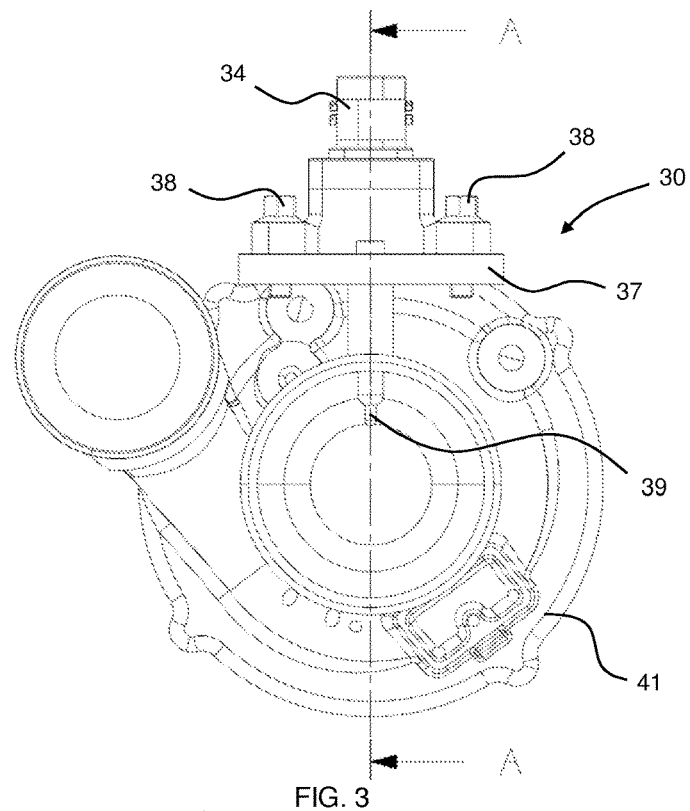
FIG. 3 is a front view of the integrated MAF sensor assembly of FIG. 2.

FIG. 1B schematically illustrates an engine layout generally a similar to FIG. 1A, but incorporating an air inlet system 60 according to embodiments of the present invention, as well as an engine block 20 having combustion chambers 22. In this system, a MAF sensor assembly 30 is located so as to take mass air flow readings directly upstream of either a turbocharger 40, a throttle 50 or an inlet manifold 62, in the positions shown in broken lines at 27, 28 respectively. Only one such MAF sensor assembly will be fitted to an engine, and its location will depend upon whether an engine is fitted with a turbocharger, for example.

In this system, an additional temperature sensor 29 may be located towards an upstream end of an air inlet duct 24 close to the air filter 23 in order to provide an external air temperature.

In this embodiment the engine is a diesel engine, but it is anticipated that the present invention may be applicable to IC engines using other fuels such as petrol, biodiesel or CNG.

For the purposes of the present application the turbocharger, throttle and inlet manifold are collectively defined as "air flow control components" as they all act on the air flow prior to its entry into the combustion chambers.

FIGS. 2 to 6 illustrate in more detail an air flow control component in the form of a turbocharger 40, according to an embodiment of the present invention. The turbocharger comprises a compressor 42 (FIG. 1B), a turbine 43 (FIG. 1B) linked by a shaft 64 (FIG. 1B), a compressor housing 41 and a turbine housing (not shown). The turbocharger may be mounted directly to an engine block, or mounted via a bracket (not shown) or via another components, such as a cylinder head (not shown), or an exhaust manifold (not shown).

In this embodiment, the compressor housing 41 is a single cast metal component (i.e. it is formed in a single casting operation and does not have additional components welded or otherwise secured thereon so as to form the general shape). It is formed with various integral features and is subjected to machining operations e.g. to provide suitably planar mating surfaces and bores through which bolts may be fitted.

Figure 4:
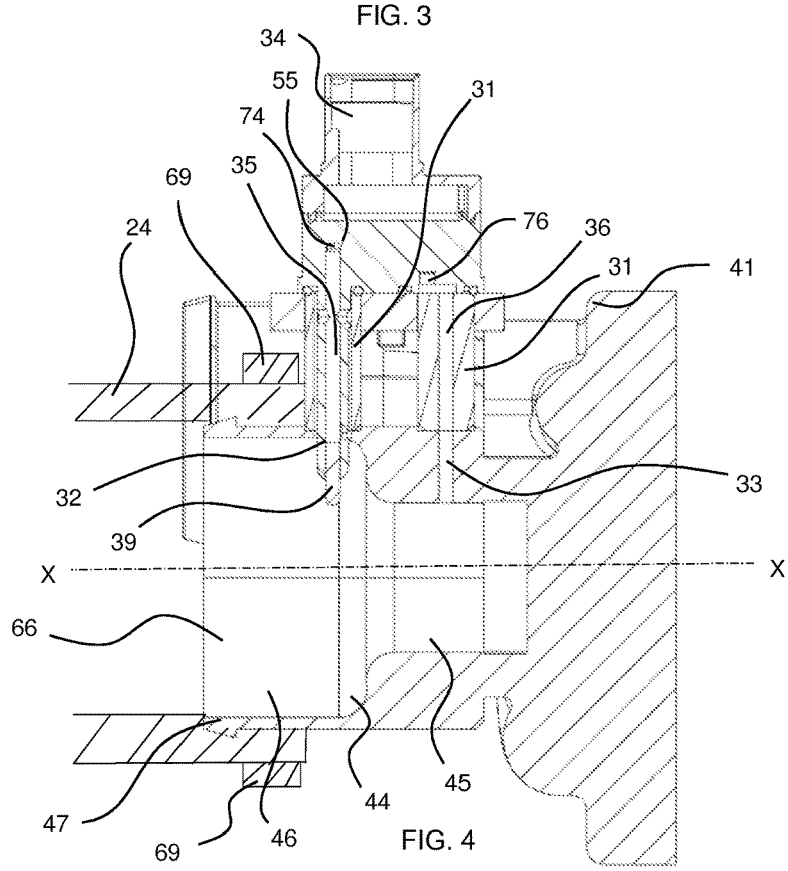
FIG. 4 is a cross-sectional view of the integrated MAF assembly of FIG. 3 on the A-A plane.
Figure 5:
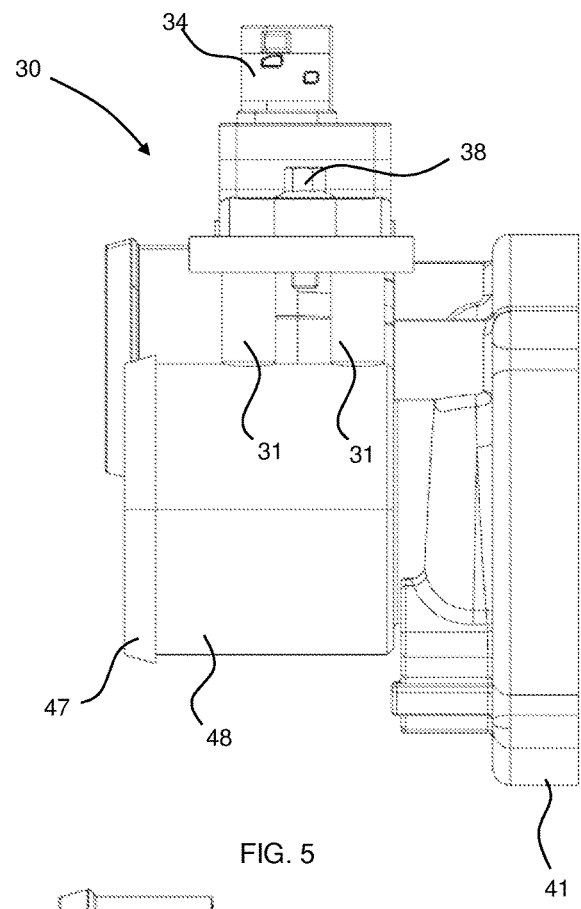
FIG. 5 is a side view of the integrated MAF assembly of FIG. 3.
Figure 6:
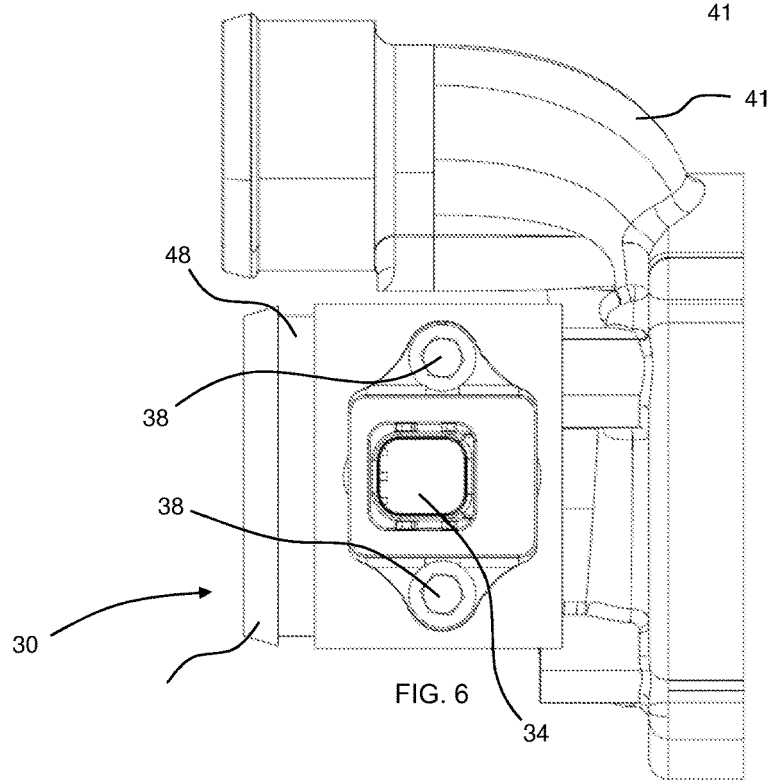
FIG. 6 is a plan view of the integrated MAF assembly of FIG. 2.
Figure 7:
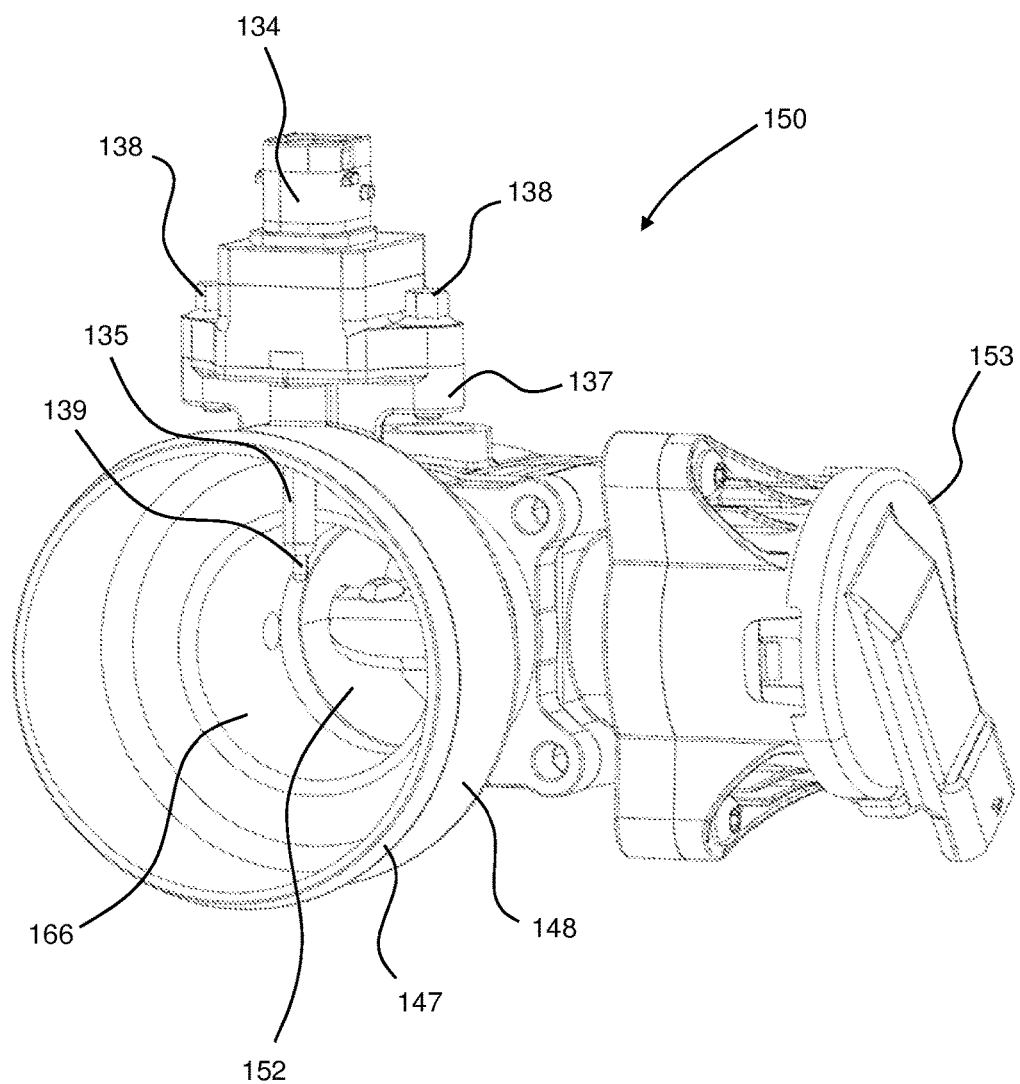
FIG. 7 is an isometric view of a MAF sensor assembly mounted upstream of a throttle according to a second embodiment of the present invention.
Figure 8:
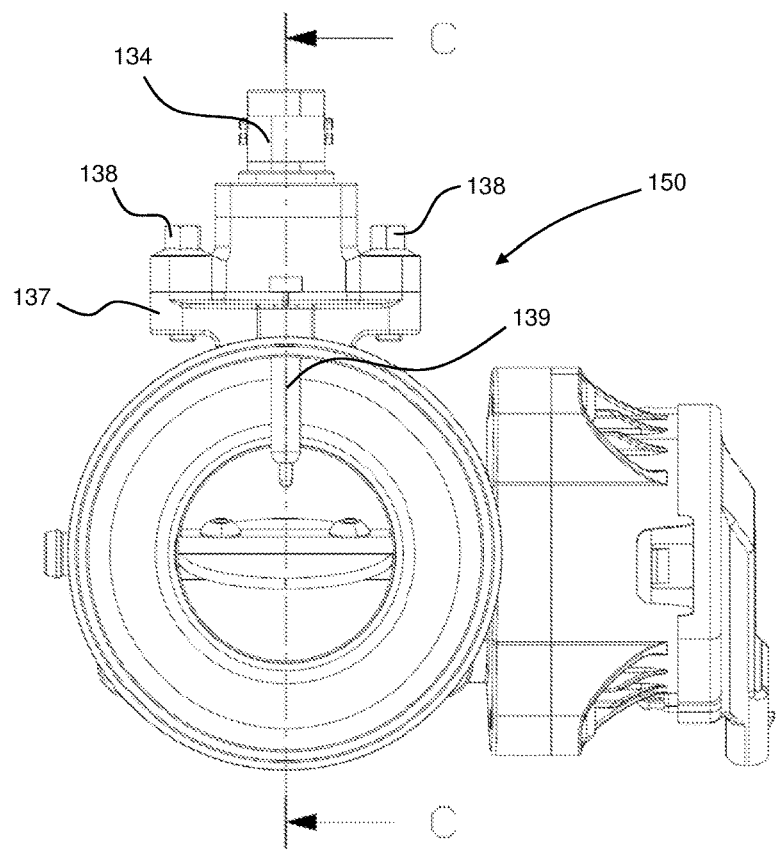
FIG. 8 is a front view of the MAF sensor assembly and throttle of FIG. 7.
Figure 9:
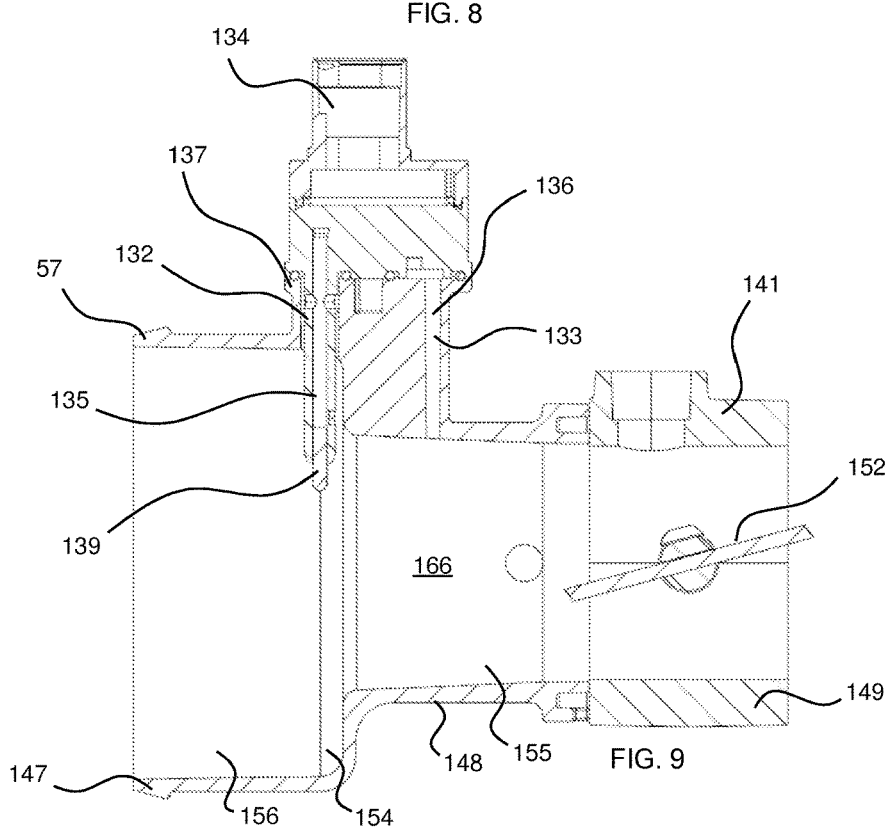
FIG. 9 is a cross section view of the standalone MAF sensor assembly of FIG. 8 on the plane C-C.
Figure 10:
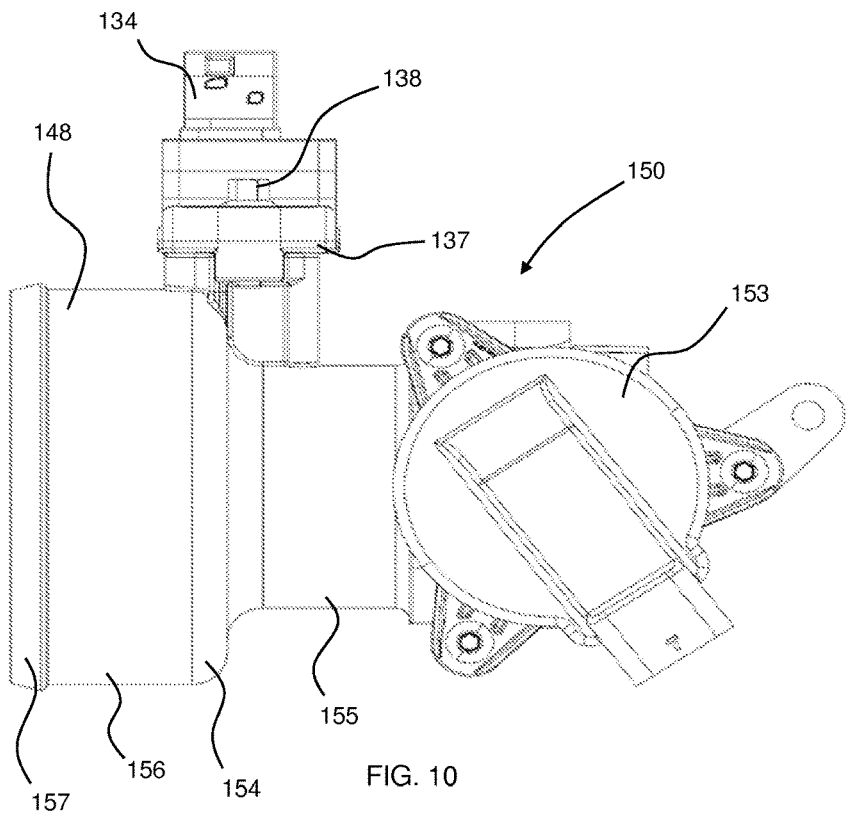
FIG. 10 is a side view of the MAF sensor assembly and throttle of FIG. 7.
Figure 11:
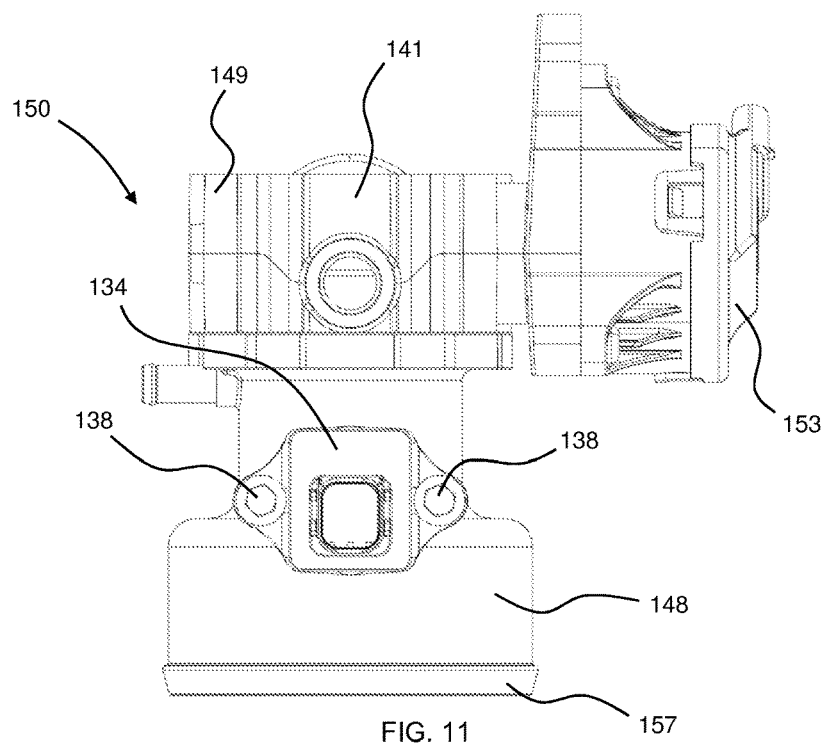
FIG. 11 is a plan view of the MAF sensor assembly and throttle of FIG. 7.
Figure 12:
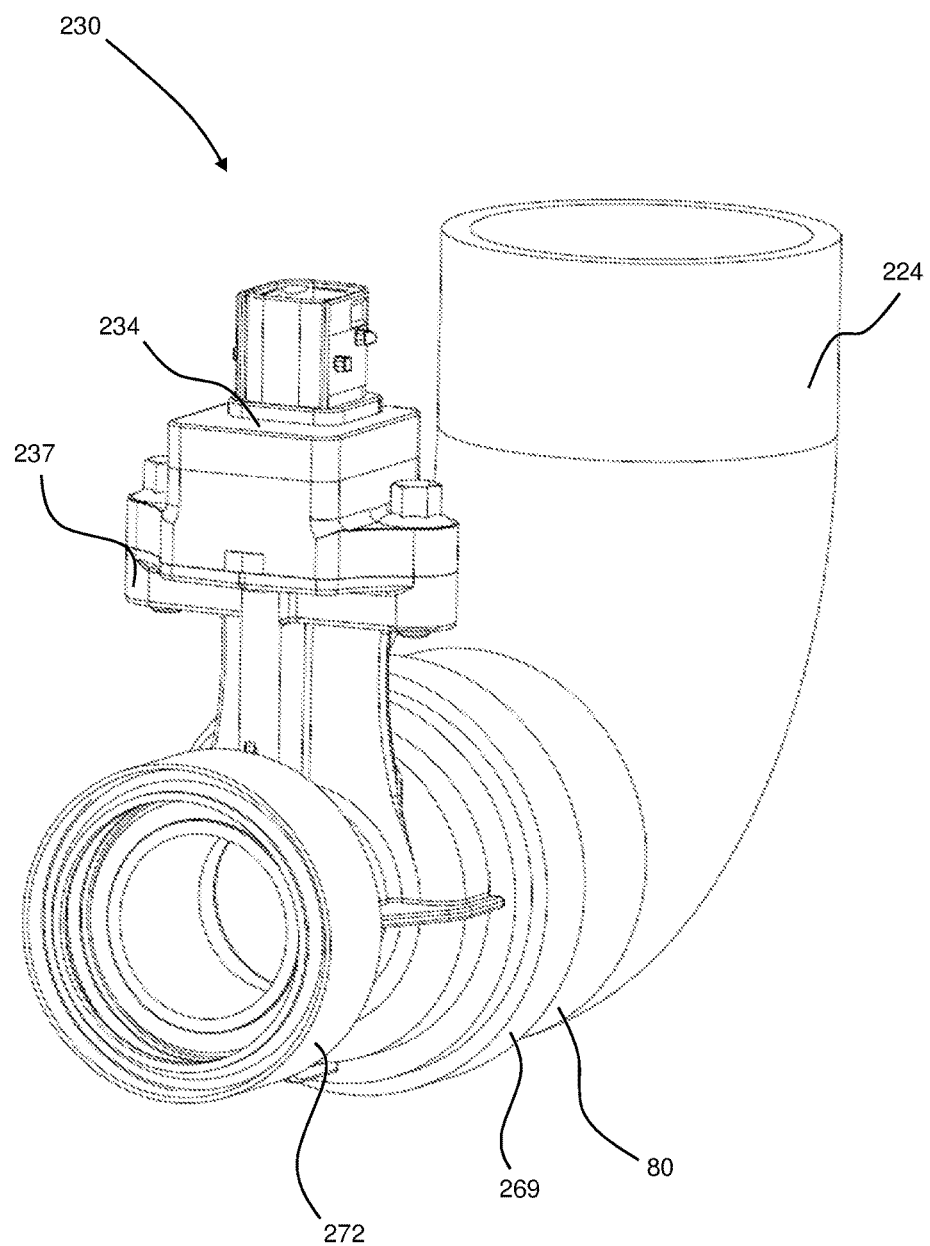
FIG. 12 is an isometric view of a standalone MAF sensor assembly according to a third embodiment of the present invention.

The compressor housing 41 comprises an integral inlet 48 and an integral outlet 49 where the compressor inlet 48 extends upstream from the centre of the turbocharger 40, coaxially with an axis of rotation X-X of the compressor, shaft and turbine (not shown) (FIG. 4). The compressor outlet 49 has an axis parallel to, but offset from axis X-X in this embodiment. In other embodiments, the compressor outlet may have an axis substantially perpendicular to the axis X-X.

The compressor inlet 48 includes an extension which extends upstream further than in known turbochargers. The internal bore of the inlet comprises a Venturi tube 66 (FIG. 4) in this embodiment. Again, this is formed from the same casting as the compressor housing. This may minimise the footprint of the overall turbocharger assembly 40 and may produce a more robust assembly. In the direction of air flow the compressor inlet 48 comprises a large diameter open end 46 which engages with the air duct 24, a convergent region 44 and a reduced diameter region 45 located at the downstream end of the compressor inlet (i.e. immediately upstream of the compressor). The large diameter open end 46, the convergent region 44, and the reduced diameter region 45 in series form the Venturi tube 66.

The compressor inlet 48 further comprises two bores 32, 33 which extend radially through the wall defining the inlet 48. The bores enable two measuring tubes 35, 36 located within the bores 32, 33 to transmit air pressure externally of the inlet 48 to be measured by two measuring ports 74, 76 which are located in the sensor body 34 of the MAF sensor assembly 30 proximate the top of the measuring tubes 35, 36 respectively. The sensor body 34 contains suitable electrical pressure and temperature sensing components for this purpose and a connector for electrical cables to transmit signals indicative of the mass air flow and temperature to and engine ECU (not shown).

The first measuring tube 35 is located in the larger diameter end 46 close to the convergent region 44 of the compressor inlet 48 and includes a temperature sensor 39 at a free end thereof such that the temperature sensor extends into the compressor housing. A transverse bore 55 of the tube above the temperature sensor allows air pressure to be transmitted up the tube to the sensor body 34. This tube 35 is mounted to the sensor body 34 and is inserted as a unit through the bore 32. The tube 35 is also encased within a pipe 31 radially outward of the bore 32. A clearance is provided between the tube 35 the bore 32, and the pipe 31 to provide a pathway for the air to reach the transverse bore.

The second measuring tube 36 is directly defined by the bore 33 through the wall of the reduced diameter region 45, and a separate pipe 31 extending radially therefrom. The required separation of the two measuring tubes 35, 36 respectively to transmit the differential pressures either side of the convergent region 44 to the sensor body governs the length of the Venturi tube and hence the compressor inlet 48. In alternative embodiments, the pipe 31 may be formed integral to the housing 41.

The height of the pipes 31 is dependent on the length of the temperature sensor 39 that is built into the MAF sensor assembly 30. As such, the use of a shorter temperature sensor 39 enables shorter tubes 35, and the sensor body is able to be brought closer to the wall of the compressor inlet 48.

A mounting platform 37 for the sensor body 34 is secured to the outer ends of the pipes 31. The platform 37 provides threaded bores which receive mounting bolts 38 to releasably secure the MAF sensor body 34 to the compressor inlet 48. In alternative embodiments, the mounting platform 37 may formed integrally into the housing, e.g. formed from the same casting, machined or sintered as a single component.

It will be appreciated that the arrangement of pipes 31 is sealed air tight to the compressor inlet 48, platform 37 and the sensor body 34. The pipes 31 may be welded, soldered, screwed or pressed into the compressor inlet and platform 37 and thereby act as a structural support for the platform.

In this embodiment the larger diameter open end 46 of the compressor inlet 48 further comprises a DIN 3021-3-A peripheral rib spigot feature 47 to retain the air inlet ducting 24 in conjunction with a hose clip 69. The outer diameter of this spigot 47 is tailored to fit the air duct 24.

The MAF sensor assembly 30 requires a significant diameter difference between the open end 46 and the reduced diameter region 45. For example, if the reduced diameter region 45 comprised an internal diameter of 32.66 mm, the corresponding internal diameter of the open end 46 should be between 50 mm and 70 mm to stay within the operating range of the MAF sensor assembly 30. In other embodiments, the operating ranges of the MAF sensor may vary.

A divergent nozzle of the Venturi tube, which is typically present in conventional MAF sensors of this type, is not required in this system 60 as the compressor 42 of the turbocharger 40 introduces turbulence, meaning the flow straightening effect of the divergent nozzle is not required.

Referring to FIGS. 7 to 11, a throttle is shown generally at 150 according to another embodiment of the present invention. Corresponding components of this embodiment are labelled 100 higher with respect to FIGS. 2-6. Only differences are discussed in more detail.

The throttle 150 comprises a throttle valve 152 rotatable to open and close the throttle by an actuator 153 and a throttle housing 141. The housing 141 comprises an inlet 148 and an outlet 149, where the throttle inlet extends axially upstream from the valve 152 and throttle actuator 153. The throttle inlet 148 comprises a Venturi tube 166 of a similar format to Venturi tube 66 of the first embodiment, and which is formed from the same casting as a portion of the throttle housing, minimising the overall footprint of the overall throttle 150. The throttle 150 is typically mounted to the inlet manifold 62 of the engine. In alternative embodiments, different throttles may be used such as a double barrel or sliding plate throttle.

The throttle 150 further comprises two bores 132, 133 which extend radially into the Venturi tube 166 through a wall of the inlet 148. However this embodiment differs from the first in that the mounting platform 137 is formed from the same casting as the remainder of the inlet housing 148 and the entire length of the bores 132, 133 is defined by the casting.

FIGS. 12 to 16 illustrate what can conveniently be described as a "standalone" MAF sensor assembly 230 according to a third embodiment of the present invention, corresponding components of this figure are labelled 100 higher with respect to FIGS. 7-11. Only differences are discussed in more detail.

The standalone MAF sensor 230 is fixed to a downstream end 80 of an air inlet duct 224 via a constant tension hose clip 269. In alternative embodiments, other retention methods suitable for the operating environment may be used. The standalone MAF sensor assembly 230 further comprises a V-band clip 272, through which it can be secured to upstream end of an air flow control component—e.g. to the open end of either a standard turbocharger compressor housing (not shown), a standard throttle (not shown) or a standard intake manifold housing (not shown). In alternative embodiments, different gas tight interfaces suitable for the operating environment may be used. As in the first and second embodiments, the MAF sensor assembly 230 comprises two measuring tubes 235, 236 which extend from the sensor into the Venturi tube 266 and two measuring ports 274, 276.

In this embodiment, the air inlet ducting 224 attached to the standalone MAF sensor assembly 230 comprises an arc upstream of the standalone MAF sensor where the curvature of the arc is defined by an angle $\alpha$. The ducting 224 defines an axis Z-Z corresponding to the centre line of the ducting immediately upstream of the arc. The standalone MAF sensor 230 defines an axis of rotation Y-Y, equating to the axis X-X as described above, where the angle $\alpha$ is defined as the angle between the axes Z-Z and Y-Y. In this embodiment, the angle $\alpha$ is shown to be 90° however in alternative embodiments this could be any angle.

Figure 13:
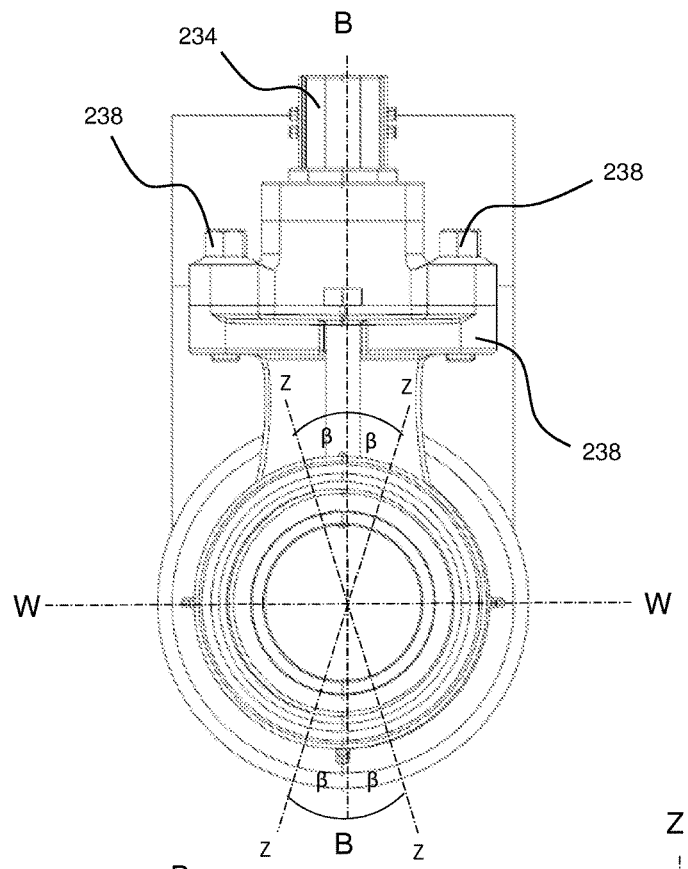
FIG. 13 is a front view of the standalone MAF sensor assembly of FIG. 12.
Figure 14:
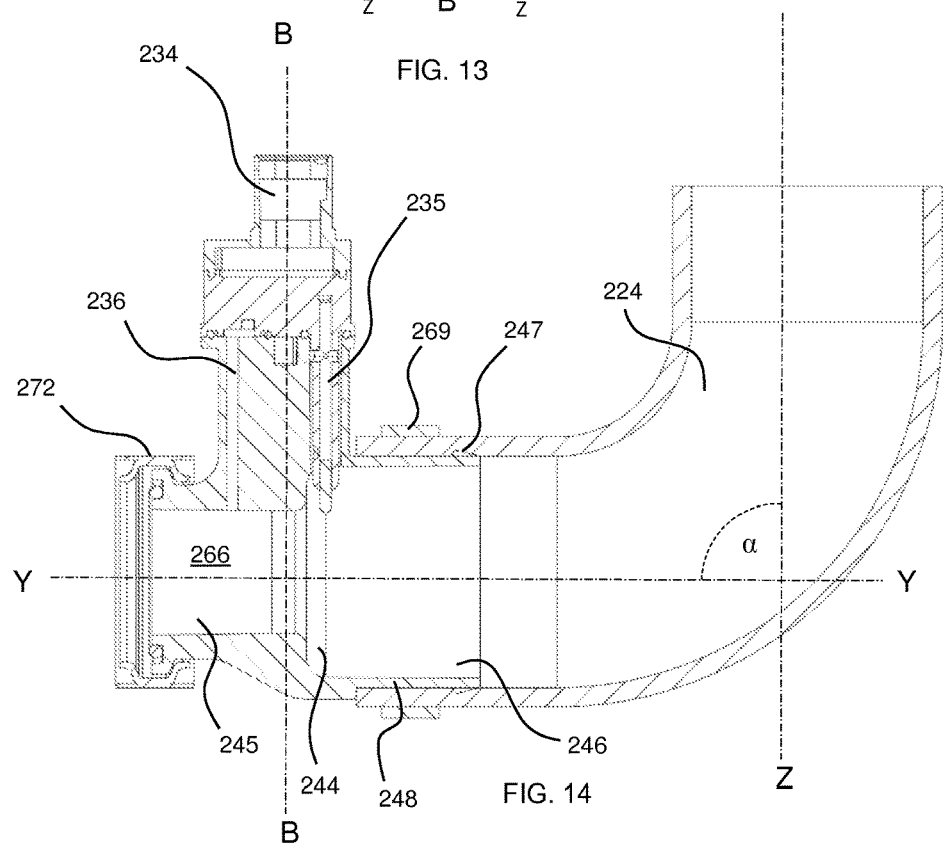
FIG. 14 is a cross section view of the standalone MAF sensor assembly of FIG. 13 on the plane B-B.
Figure 15:
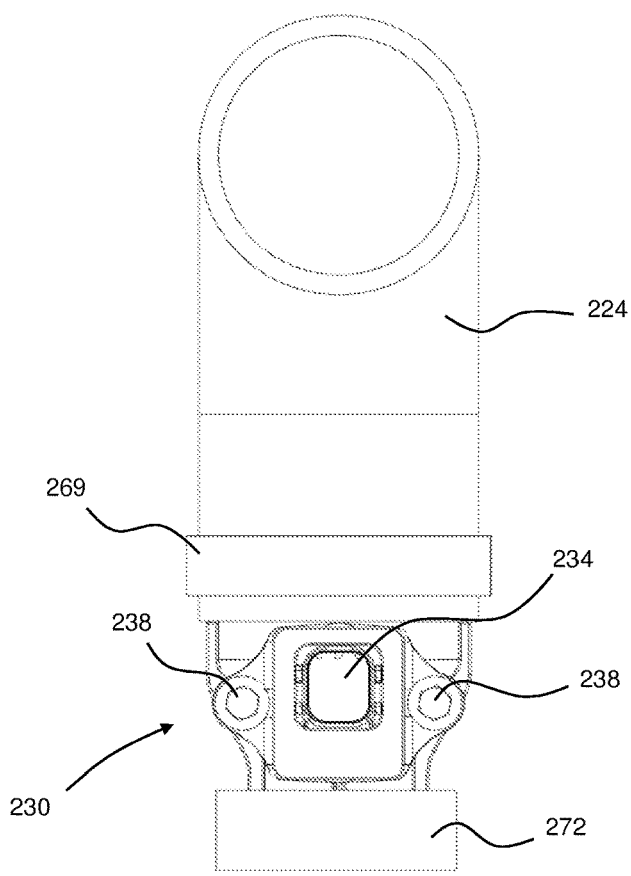
FIG. 15 is a plan view of the standalone MAF sensor assembly of FIG. 12.
Figure 16:
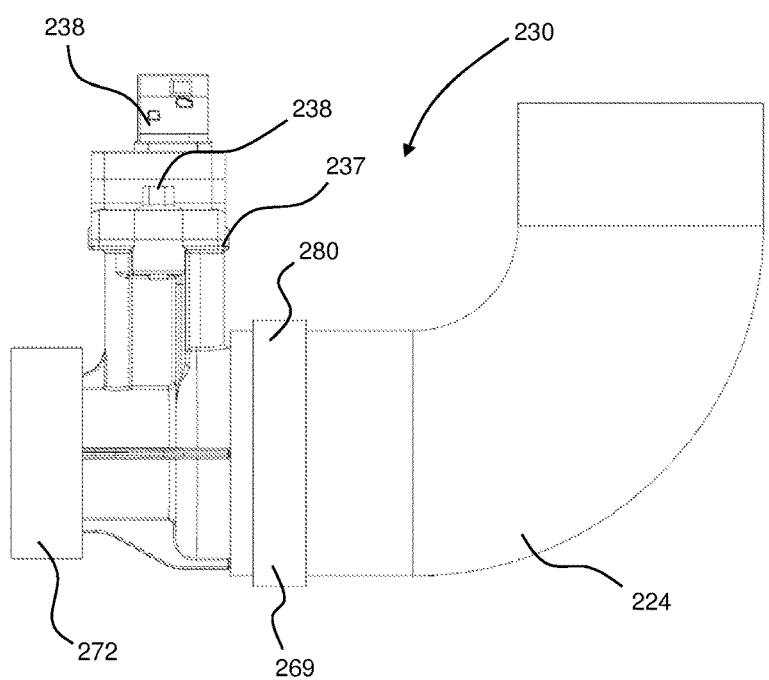
FIG. 16 is a side view of the standalone MAF sensor assembly of FIG. 12.

The standalone MAF sensor 230 defines an axis B-B corresponding to the centre line of the MAF sensor, which is fixed with an angle of 90° with respect to the axis Y-Y. The angle $\alpha$ thus defines the co-planarity between the axes B-B and Z-Z. The axis B-B of the MAF sensor 230 defines an angle $\beta$ with respect to the axis Z-Z of the inlet ducting 224. The angle $\beta$ corresponds to the angle of rotation between the axes B-B and Z-Z and in this embodiment is 0°. In other embodiments the angle $\beta$ can vary between ±30° as illustrated in FIG. 13. Once the angle $\alpha$ is fixed, the angle $\beta$ can be varied by ±30° without requiring recalibration of the MAF sensor 230.

These configurations produce repeatable airflow that allows the MAF sensor assembly 230 to determine the air flow to within an acceptable level of accuracy. If angles within this range are not available for the inlet ducting 224 then the inlet ducting may comprise a straight region which is equal in length to seven times the internal diameter of the duct. As such, the standalone unit may be mounted within an air inlet duct without requiring additional calibration, irrespective of the downstream components and remaining upstream ducting to which it is mounted. Similar considerations apply to the upstream ducting of the assemblies of the first and second embodiments.

The surface roughness of the Venturi tube and the sensor plate 37 are provided according to the MAF sensor specification, and additional machining or treatment of these surfaces may be carried out to meet this specification.

It is typical for an IC engine to have its internal components such as pistons, con rods, crankshaft, cam shaft, pushrods, valves, flywheel etc. to be assembled on one production line. It is usual for various externally mounted ancillary components such as starter motor, alternator, turbocharger, intercooler, throttle, oil pump, etc. to also be assembled on a first production line at the same first location by use of suitable brackets and fasteners such as bolts. These ancillary components are said to be "on engine".

It is common for the engine and the aforesaid "on engine" components to be installed into a machine (e.g. a working machine such as a backhoe loader, telehandler, loading shovel, slew excavator, skid steer loader, tractor, generator) at a second location, which is usually remote from the first (e.g. a different factory in a different location or a different part of a large factory). During this installation, the engine will be connected to the cooling system (heat exchangers and associated hoses), fuel system (fuel tank, fuel filter etc.), and air intake system (the aforementioned air filter and air inlet ducting). All of these may be bespoke for the particular packaging needs of that machine to produce a compact, well ventilated, easy to service and reliable layout.

It will be appreciated that the present invention, by altering the location of the MAF, enables the MAF to be an "on engine" component by virtue of its whole or partial integration with, and its support on a component that is already mounted on engine. This means that may be assembled at an earlier stage of an overall machine build, standardising the assembly approach to some degree, and may require no or reduced calibration. Whilst this approach may require an additional ambient air temperature sensor to be fitted to a machine, it is anticipated that the nominal additional cost of this is significantly outweighed by the cost savings outlined above.

The term "unitary component" as used herein means the component is formed from the same contiguous or monolithic mass by a process such as casting, sintering, forging or moulding, and does not include components formed from two or more parts that are joined together by welding, gluing or brazing, for example.

Although the invention has been described above with reference to one or more preferred embodiments, it will be appreciated that various changes or modifications may be made without departing from the scope of the invention as defined in the appended claims.

The differential pressure sensor could be replaced by a different sensor, such as a vane meter sensor, a cold wire sensor. Replacing the differential pressure sensor with a hot wire or a membrane sensor would also remove the need to incorporate a separate temperature sensor into the MAF sensor.

In other embodiments, alternative constructions may be used. For example the inlet may be welded, brazed, glued, or secured with fasteners to its associated air flow control components. The housing may be fabricated, forged or moulded rather than being cast.

The invention claimed is:

1. An air inlet system for an internal combustion engine comprising:
    an air inlet duct which has an upstream end including an opening and a downstream end for connection to an air flow control component; and
    a mass air flow sensor assembly, the mass air flow sensor assembly being located closer to the downstream end than the upstream end, wherein the mass air flow sensor assembly includes an air pressure sensor, wherein the air pressure sensor is a Venturi tube, and wherein the Venturi tube does not have a downstream divergent nozzle, wherein, in the direction of air flow, the Venturi tube comprises an open end for engaging with the air inlet duct, a convergent region, and a reduced diameter region, and wherein the Venturi tube is configured to sense a pressure differential upstream and downstream of the convergent region.

2. An air inlet system according to claim 1, wherein the mass air flow sensor assembly is mounted proximate to an upstream inlet of the air flow control component.

3. An air inlet system according to claim 1, wherein the air flow control component is a turbocharger, a throttle or an inlet manifold.

4. An air inlet system according to claim 1, wherein the Venturi tube includes bores for measuring tubes of the mass air flow sensor assembly to extend through the housing.

5. An air inlet system according to claim 1, wherein the mass air flow sensor assembly further comprises a temperature sensor.

6. An air inlet system according to claim 1, wherein the Venturi tube comprises an inlet and an outlet and wherein the ratio of internal diameters of the outlet and inlet of the Venturi tube system is between 1:1.5 and 1:2.2.

7. An air inlet system according to claim 1, wherein the air inlet duct comprises a curve, having a pre-determined angle, upstream of the mass air flow sensor assembly.

8. An air inlet system according to claim 1, wherein the air inlet ducting comprises a straight portion upstream of the mass air flow sensor assembly which is equal to at least seven times the diameter of the air inlet duct.

9. An air inlet system according to claim 1, wherein the air flow control component comprises a housing, and wherein the housing comprises a platform for mounting a mass air flow sensor of the mass air flow sensor assembly thereon.

10. An air inlet system according to claim 9 wherein the housing comprises an extension extending upstream from the air flow control component.

11. An air inlet system according to claim 9, wherein a mass air flow sensor of the mass air flow sensor assembly is mounted directly onto the housing and is releasably secured to the upstream extension of the housing.

12. An air inlet system according to claim 10, wherein the upstream extension of the air flow control component housing includes the Venturi tube, and wherein the housing is a cast component and the Venturi tube is formed from the same casting as the housing.

13. An air inlet system according to claim 1, wherein the mass air flow sensor assembly is a standalone mass air flow sensor assembly, being separate and attachable to the air flow control component, and wherein the standalone mass air flow sensor assembly is attached upstream of the housing of the air flow control component.

14. An air flow control component for an internal combustion engine comprising:
   a housing, wherein the housing is a unitary cast component; and
   a mass air flow sensor assembly mounted onto the housing proximate an upstream inlet of the air flow control component,
   wherein the mass air flow sensor assembly includes an air pressure sensor, wherein the air pressure sensor is a Venturi tube, and wherein the Venturi tube does not have a downstream divergent nozzle, wherein, in the direction of air flow, the Venturi tube comprises an open end for engaging with the air inlet duct, a convergent region and a reduced diameter region, and wherein the Venturi tube is configured to sense a pressure differential upstream and downstream of the convergent region.

15. An air flow control component according to claim 14, wherein the Venturi tube is integrally formed with the housing.

16. An internal combustion engine comprising an air flow control component and a mass air flow sensor assembly, wherein the air flow control component and mass air flow sensor assembly are mounted on the engine wherein the mass air flow sensor assembly is mounted proximate an upstream inlet of the air flow control component, wherein the mass air flow sensor assembly includes an air pressure sensor, wherein the air pressure sensor is a Venturi tube, and wherein the Venturi tube does not have a downstream divergent nozzle, wherein, in the direction of air flow, the Venturi tube comprises an open end for engaging with the air inlet duct, a convergent region and a reduced diameter region, and wherein the Venturi tube is configured to sense a pressure differential upstream and downstream of the convergent region.

17. An internal combustion engine according to claim 16, wherein the air flow control component comprises a housing which is cast and the mass air flow sensor assembly is mounted onto the housing casting.

18. An internal combustion engine according to claim 17, wherein the Venturi tube is integrally formed with the housing.

* * * * *